(12) United States Patent
Schnitzer et al.

(10) Patent No.: US 8,006,587 B2
(45) Date of Patent: Aug. 30, 2011

(54) ADJUSTABLE STEERING COLUMN FOR A MOTOR VEHICLE

(75) Inventors: Rony Schnitzer, Ruggell (CH); Roland Heiml, Vöcklamarkt (AT)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 801 days.

(21) Appl. No.: 11/979,343

(22) Filed: Nov. 1, 2007

(65) Prior Publication Data

US 2009/0013817 A1  Jan. 15, 2009

(30) Foreign Application Priority Data

Jan. 16, 2007 (DE) .......................... 10 2007 003 091

(51) Int. Cl.
B62D 1/18 (2006.01)
(52) U.S. Cl. ........................................................ 74/493
(58) Field of Classification Search .................. 74/485, 74/492, 493, 495, 504; 280/775; 70/182, 70/183, 184; 297/366
See application file for complete search history.

(56) References Cited

U.S. PATENT DOCUMENTS

| | | | | |
|---|---|---|---|---|
| 3,741,032 | A * | 6/1973 | Baker | 74/492 |
| 5,161,425 | A | 11/1992 | Baskett et al. | |
| 5,743,150 | A * | 4/1998 | Fevre et al. | 74/493 |
| 6,139,057 | A | 10/2000 | Olgren et al. | |
| 6,419,269 | B1 * | 7/2002 | Manwaring et al. | 280/775 |
| 6,659,504 | B2 * | 12/2003 | Riefe et al. | 280/777 |
| 7,350,815 | B2 | 4/2008 | Spano et al. | |
| 2004/0261565 | A1 * | 12/2004 | Uphaus et al. | 74/493 |
| 2006/0090586 | A1 * | 5/2006 | Lee | 74/492 |

FOREIGN PATENT DOCUMENTS

DE        33 08 788        9/1983

(Continued)

OTHER PUBLICATIONS

International Search Report issued Feb. 6, 2008 in the International (PCT) Application of which the present application is the U.S. National Stage.

*Primary Examiner* — Vicky A Johnson
(74) *Attorney, Agent, or Firm* — Wenderoth, Lind & Ponack, L.L.P.

(57) ABSTRACT

An adjustable steering column for a motor vehicle includes a setting unit displaceable in at least one setting direction, a holding unit nondisplaceable in this setting direction, and a securement device. In the opened state of the securement device, the setting unit is displaceable with respect to the holding unit for setting the position of the steering column and, in the closed state of the securement device, the setting unit is secured with respect to the holding unit by the securement device. The securement device includes a clamp bolt penetrating openings in the setting unit and holding unit, at least one tooth plate penetrated by the clamp bolt, which tooth plate comprises at least one toothing (set of teeth) with teeth directed away from the clamp bolt. The holding unit has at least one toothing (set of teeth), facing the clamp bolt for cooperation with the at least one toothing of the tooth plate in the closed state of the securement device. The tooth plate is implemented elastically flexibly and disposed between the holding unit and a press-on part, penetrated by the longitudinal axis of the clamp bolt, by which it is pressed onto the holding unit in the closed state of the securement device. The at least one toothing of the tooth plate in the opened state of the securement device is spaced apart by spring force in the direction of the longitudinal axis of the clamp bolt from the at least one toothing of the holding unit.

18 Claims, 8 Drawing Sheets

FOREIGN PATENT DOCUMENTS

| | | |
|---|---|---|
| DE | 10 2004 051 060 | 1/2006 |
| EP | 0 440 403 | 1/1991 |
| EP | 0 802 104 | 10/1997 |
| EP | 1 500 570 | 1/2005 |
| EP | 1 681 223 | 7/2006 |
| GB | 2 297 607 | 8/1996 |

* cited by examiner

ADJUSTABLE STEERING COLUMN FOR A MOTOR VEHICLE

BACKGROUND OF THE INVENTION a) Field of the Invention

The invention relates to an adjustable steering column for a motor vehicle, and includes a setting unit displaceable in at least one setting direction, a holding unit nondisplaceable in this setting direction and a securement device. In the opened state of the securement device, the setting unit is displaceable with respect to the holding unit for setting the position of the steering column, and in the closed state of the securement device, the setting unit is secured in place by the securement device. The securement device comprises a clamp bolt, penetrating openings in the setting unit and the holding unit, at least one tooth plate penetrated by the clamp bolt, which tooth plate comprises at least one toothing with teeth directed away from the clamp bolt, and at least one toothing, facing the clamp bolt, of the holding unit for cooperation with the at least one toothing of the tooth plate in the closed state of the securement device.

b) Description of Related Prior Art

Adjustable steering columns serve for the adaptation of the position of the steering wheel to the seating position of the driver and are known in diverse embodiments. Apart from adjustable steering columns which are only adjustable with respect to the directions of length or height or inclination, steering columns are also known which are length—as well as also height—or inclination-direction adjustable. Such an adjustable steering column is disclosed, for example, in EP 0 802 104 A1. In the opened state of the securement device, a setting unit rotatably bearing-supporting the steering spindle is displaceable with respect to a chassis-stationary holding unit in the direction of a length adjustment as well as also in the direction of a height or inclination adjustment of the steering column. To increase the holding forces in the closed state of the securement device, the securement device comprises intersecting disk packs cooperating in the manner of a multi-disk coupling.

For adjustable steering columns the problem is encountered that in the event of a crash, uncontrolled displacement of the steering column must be prevented such that, for example, the function of the airbag is not impaired and/or the energy upon the impact of the driver onto the steering wheel can be dissipated under control. The securement device should at the same time be readily-moved and it should be possible to open and close the device with minimal strokes of the actuation members and it should assume only low installation space.

In addition to adjustable steering columns with securement devices acting under frictional locking, securement devices are known which act under positive locking, in which in the closed state toothed securement elements come into engagement with one another. One problem entailed therein is that during the closing the teeth of the securement device can impact one another directly. Several devices intended to prevent this have become known. EP 1 500 570 A2 discloses securement elements utilized herein, which have rows of toothings offset with respect to one another. The toothings are here disposed on faces of tooth bars positioned in the form of wedges with respect to one another, in which bars are held in a base body penetrated by the clamp bolt of the securement device.

U.S. Pat. No. 6,139,057 A discloses a positive locking securement device in which, through the closing of the securement device, tooth parts swivellable through an actuation lever come to mesh with countertoothings. If during the closing of the securement device the tips of the teeth of the toothing of a tooth part impact the tips of the teeth of the countertoothing (this position is also referred to as "tooth-on-tooth position"), to make possible the complete swivelling of the actuation lever into its closure position without too great a resistance, the plates of sheet metal bearing the toothings are elastically supported with respect to the shaft bearing them. In order to obtain tooth meshing in all setting positions of the setting unit, for each setting direction two adjacent tooth plates with offset teeth are provided.

Further, US 2006/0090586 A1 discloses an adjustable steering column of the above described type in which, in the closed state of the securement device, for the friction-locked retention system of the setting unit with respect to the holding unit, side jaws of the chassis-stationary holding unit are pressed onto the setting unit. In order to prevent in the event of a crash an uprighting or pop-up (=an inclination or height adjustment) of the steering column, a toothed plate disposed rotatably on the clamp bolt with a toothing implemented on a side edge is additionally provided. When closing the clamping lever, the toothing of the tooth plate is pressed against a countertoothing by a spring entrained by the clamping lever. During the opening of the clamping lever, the tooth plate is swivelled through an actuator of the clamping lever about the axis of the clamp bolt and brought out of engagement with the countertoothing. In the event of a crash, the toothing, if it has not already been brought into engagement with the countertoothing during the closing of the securement device, after a small initial shift of the setting unit and a dislocation of the clamp bolt concomitant therewith and the tooth plate disposed thereon, is brought into engagement with the countertoothing. Since in the closed state of the securement device the tooth plate is only pressed against the countertoothing by the spring, in the event of a crash there can be the risk of the two toothings slipping through, and accordingly, the spring must be designed such that it is very strong. Thereby, the closing force for the securement device is increased.

DE 10 2004 051 060 B3 shows an adjustable steering column in which a crash blocking device is provided, from which, in the event of a crash, an additional holding force is exerted against a dislocation of the setting unit with respect to the holding unit. In the event of a crash, a clamping wedge is pushed into a gap between the setting unit and the holding unit. The clamping wedge is connected with a part of the securement device which moves during the opening and closing of the securement device, such that during the closing of the securement device, a contact face of the clamping wedge can be placed onto a locating face of the setting unit, in order to entrain by it the clamping wedge in the event of a crash at an onsetting dislocation of the setting unit.

SUMMARY OF THE INVENTION

The problem addressed by the invention is providing an adjustable steering column of the type described in the introduction, in which, in the closed state of the securement device, in a simple manner at least in one predetermined setting direction, a dislocation of the setting unit with respect to the holding unit is counteracted even at higher acting forces, wherein the operating forces of the securement device are kept at a low level. This is attained according to the invention through an adjustable steering column with the characteristics of a first aspect of the invention. Advantageous further developments are also evident.

According to the invention this is attained through an adjustable steering column for a motor vehicle comprising a setting unit displaceable in at least one setting direction, a holding unit nondisplaceable in this setting direction, and a securement device. In the opened state of the securement device the setting unit is displaceable with respect to the holding unit for setting the position of the steering column and, in the closed state of the securement device the setting unit is secured by the securement device with respect to the holding unit. The securement device comprises a clamp bolt, penetrating openings in the setting unit and holding unit. At least one tooth plate is penetrated by the clamp bolt, and the tooth plate includes at least one toothing with teeth directed away from the clamp bolt. The holding unit has at least one toothing, facing the clamp bolt, for the cooperation with the at least one toothing of the tooth plate in the closed state of the securement device. The tooth plate is developed such that it is elastically flexible and is disposed between the holding unit and a press-on part, penetrated by the longitudinal axis of the clamp bolt, by which press-on part it is pressed onto the holding unit in the closed state of the securement device.

The at least one toothing of the tooth plate in the opened state of the securement device is spaced apart from the at least one toothing of the holding unit through spring force in the direction of the longitudinal axis of the clamp bolt.

In a steering column of the invention is disposed a tooth plate, elastically flexible under a clamping force exertable by the securement device in its closed state, between the holding unit and a press-on part penetrated by the axis of the clamp bolt. The at least one toothing of the tooth plate is directed away from the clamp bolt and its teeth are preferably aligned at right angles to the longitudinal axis of the clamp bolt and at right angles to the setting direction in which the tooth plate is effective. The at least one toothing of the holding unit, which cooperates with the at least one toothing of the tooth plate, faces the clamp bolt and the teeth of this toothing are preferably aligned at right angles to the longitudinal axis of the clamp bolt and at right angles to the setting direction in which the tooth plate is effective.

During the closing of the securement device the tooth plate is pressed against the holding device by the press-on part. The teeth of the at least one toothing of the tooth plate either come directly into engagement with the corresponding teeth of the at least one toothing of the holding unit or, under the elastic deflection under load of the tooth plate, rest in contact on the side faces of the teeth of the toothing of the holding unit. In the latter case, first a mutual tooth engagement occurs if the tooth plate at a sufficiently high force action starts to slip through into the setting direction in which it acts, with respect to the holding unit. After a minimal shift of the tooth plate with respect to the holding unit, the teeth of the tooth plate arrive next to the tooth interspaces of the toothing of the holding unit and, through the elasticity of the plate are pressed into these tooth interspaces. During the opening of the securement device, the press-on part is pressed away from the holding unit through spring force and the at least one toothing of the tooth plate is spaced apart, through spring force in the axial direction of the clamp bolt, from the at least one toothing of the holding unit. In an advantageous embodiment of the invention, this spring force can be applied by the elastic tooth plate itself, for example in that this plate is equipped with spring-elastic arms stayed on the holding unit. The tooth plate can herein also replace a conventionally provided opening spring of the securement device. Instead, or additionally, at least one separate spring element could also be provided.

Preferably is provided that in the closed state of the securement device, the setting unit is held under frictional locking with respect to the holding unit against a displacement in the at least one setting direction. Thus through the securement device, friction faces pressed onto one another of the setting unit and holding unit are provided, which form securement elements of the securement device. The at least one toothing of the tooth plate and the toothing of the holding unit cooperating with this toothing form additional securement elements with positive-locking action, which, in the event of a crash, at least at an onsetting dislocation of the setting unit with respect to the holding unit into the setting direction in which acts the tooth plate, come into engagement in order to prevent a further dislocation of the setting unit into this setting direction. Even with relatively high forces acting onto the steering column, applied in other ways, for example if the driver pulls himself up on the steering wheel, these securement elements acting under positive locking act counter to a dislocation in the provided adjustment direction at least after a marginal initial shift.

The potential initial shift, before the toothings of the tooth plate and of the holding unit engage one another, is smaller than the distance between two successive teeth of these toothings.

The setting unit, which is carried by the holding unit connectable with the chassis of the motor vehicle, can, in one embodiment of the invention, rotatably directly bearing-support the steering spindle (and be implemented as a so-called steering column jacket). In another embodiment, the setting unit can support a jacket unit such that it is adjustable in a further setting direction, which, in turn, rotatably bearing-supports the steering spindle. In both cases, the setting unit supports the steering spindle.

Further advantages and details of the invention will be explained in the following in conjunction with the enclosed drawings.

BRIEF DESCRIPTION OF THE DRAWINGS

In the drawings:

FIGS. 1a to 3a are oblique views of a side jaw of a holding unit together with the tooth plate to explain the functional principle, FIGS. 1b to 3b show enlarged segments of FIGS. 1a to 3a, FIGS. 4 to 6 are depictions corresponding to FIGS. 1a to 3a, however seen from another viewing angle; FIG. 13 is a perspective view of an embodiment of the press-on part.

DESCRIPTION OF THE PREFERRED EMBODIMENTS

Figure 1A:
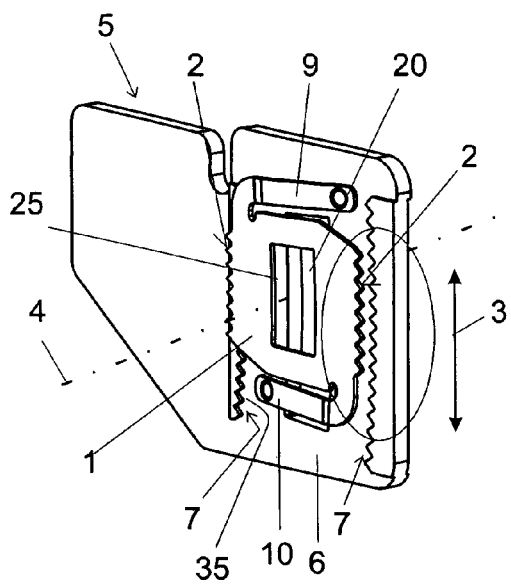

With reference to FIGS. 1 to 6, first the functional principle of the tooth plate of the steering column according to the invention will be explained. A tooth plate 1, which could also be referred to as "tooth lamella" or "tooth disk", includes at least one toothing (set of teeth) 2, whose teeth are disposed in a row extending in the setting direction 3, in which the tooth plate 1 is effective. The at least one toothing 2 is directed (face) away from a clamp bolt 19 of the securement device, of which clamp bolt in FIG. 1*a* only the longitudinal axis 4 is shown. The combs 34 of the teeth of the toothing 2 extend in the direction parallel to the longitudinal axis 4 of the clamp bolt.

The at least one toothing 2 is preferably developed on a side edge in the axial direction of the clamp bolt, the side edge extending at least substantially in the setting direction 3, in which the tooth plate 1 is effective, of the tooth plate 1.

A part of the holding unit 5, preferably a side jaw 6 of the holding unit 5, includes at least one toothing (set of teeth) 7, which is disposed in a row extending in the setting direction 3 and provided for cooperation (engagement) with the at least one toothing 2 of the tooth plate 1. This at least one toothing 7 is facing the longitudinal axis 4. The combs 35 of the teeth of toothing 7 extend in the direction parallel to the longitudinal axis 4 of the clamp bolt.

The tooth plate 1 comprises preferably first and second toothings (set of teeth) 2, which are directed away from one another, and the holding unit 5 comprises first and second toothings (set of teeth) 7, which are facing each other, and are provided for the cooperation with the first and second toothings 2 of tooth plate 1.

Figure 1B:
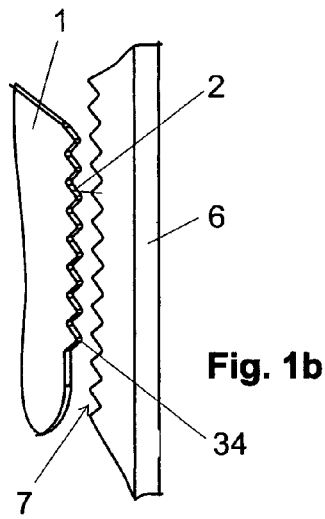
Figure 4:
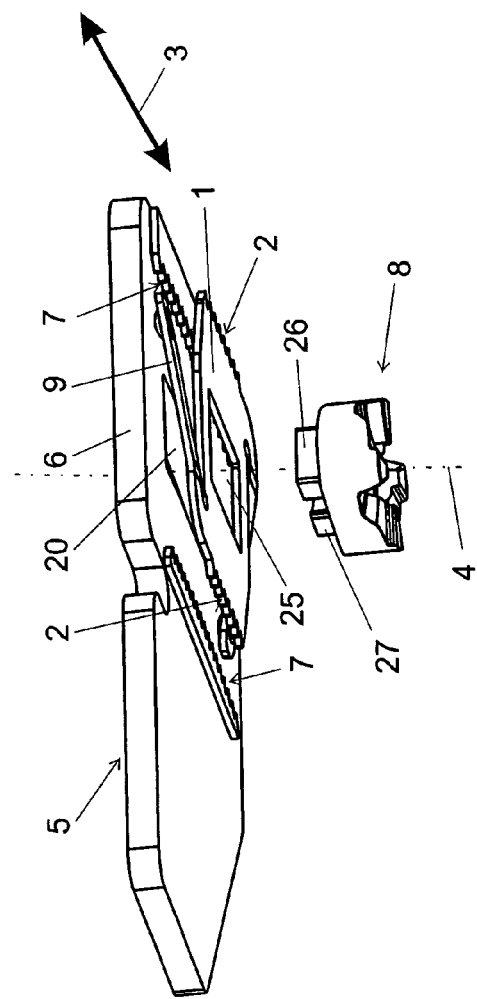
FIG. 4, in addition, the press-on part being shown in the manner of an exploded view raised from the other parts.

In the opened state of the securement device, the at least one toothing 2 of tooth plate 1 is spaced apart from the at least one toothing 7 of holding unit 5 in the direction of the longitudinal axis 4, cf. FIGS. 1 and 4. When the securement device is closed, the at least one toothing 2 of tooth plate 1 is shifted in the direction toward the holding unit 5. This shift takes place by a press-on part 8 of the securement device which is shown in FIG. 4 pulled away from tooth plate 1 and holding unit 5. If, when the tooth plate 1 is pressed onto the holding unit 5, the teeth of the at least one toothing 2 are not just then in a position in which they can move into the tooth interspaces of the toothing 7 of holding unit 5 cooperating with this toothing 2, the mutual contact of the side faces of the teeth facing one another occurs, cf. FIGS. 2 and 5. Since the at least one toothing 2 of tooth plate 1 is located laterally from the press-on region over which the press-on part 8 is in contact on tooth plate 1, and due to the elasticity of tooth plate 1, the tooth plate 1 can be pressed in this press-on region by the press-on part 8 onto the surface of the holding unit 5 such that an actuation lever of the securement device can be brought into the closure position without noticeably greater force expenditure in spite of the teeth of the toothing 2, 7 located one on the other.

Figure 2A:
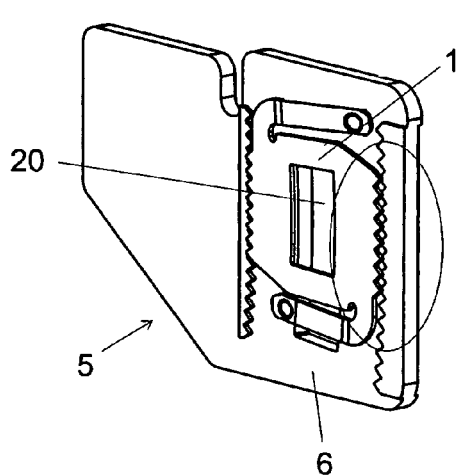
Figure 2B:
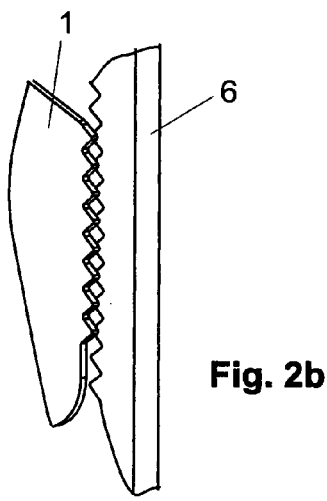
Figure 3A:
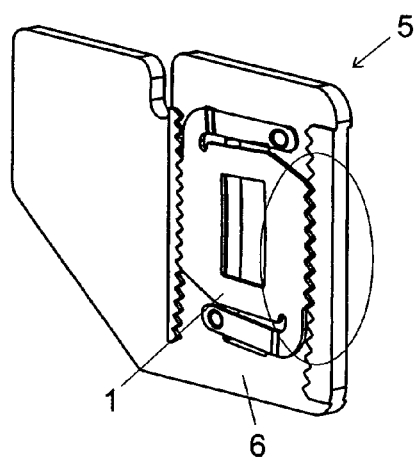
Figure 3B:
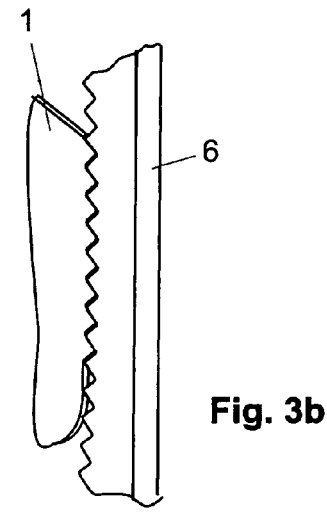
Figure 5:
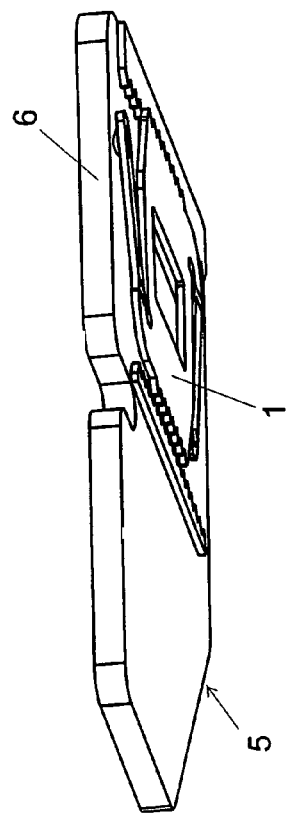
Figure 6:
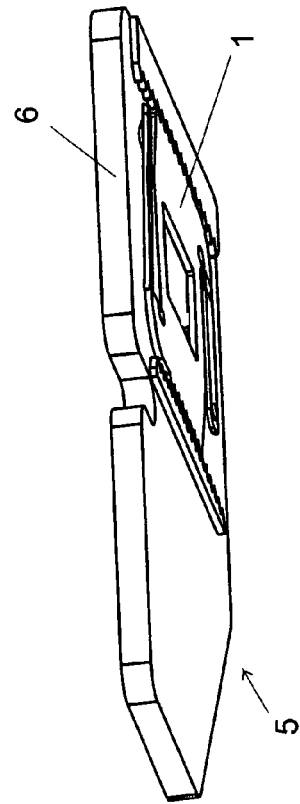

If, building on the position depicted in FIGS. 2 and 5, the tooth plate 1 is shifted minimally in the setting direction 3, the teeth of the at least one toothing 2 move next to the tooth interspaces of the teeth of toothing 7, such that the teeth of toothing 2, due to the reset force of the elastic tooth plate 1 snap into the tooth interspaces of the teeth of toothing 7. This state, in which the teeth of toothings 2, 7 are engaged, is shown in FIGS. 3 and 6. Depending on the setting position of tooth plate 1 with respect to the holding unit 5 during the closing of the securement device, this state, shown in FIGS. 3 and 6, can also be assumed immediately after the closing of the securement device.

The tooth plate 1 includes spring-elastic arms 9, 10 abutting against the holding unit 5. When the securement device is opened, the section of the tooth plate 1, including the at least one toothing 2, and with it the press-on part 8, is pushed away from the holding unit 5 by these elastic arms 9, 10, whereby the teeth of the at least one toothing 2 are again spaced apart from the teeth of the at least one toothing 7' in the direction of the longitudinal axis 4 and the state according to FIG. 1 is assumed.

The tooth plate is preferably implemented as a one-piece sheet metal punched part.

The tooth plate 1 can in principle also have only one toothing 2, which cooperates with a toothing 7 of holding unit 5. The opposing side edge could be, for example, smooth and could be free or in the closed state of the securement device cooperate with the edge, extending in the setting direction 3, of a web of the holding unit 5.

Instead of the elastic arms 9, 10, or in addition to them, at least one separate spring can also be provided in order to space the toothings 2, 7 apart in the opened state of the securement device.

In conjunction with FIGS. 7 to 9, in the following a first embodiment of a steering column according to the invention will be described, in which the previously described parts are integrated. The steering column comprises a holding unit 5, securable on the chassis of a motor vehicle. With respect to the holding unit 5, a setting unit 11 in the opened state of a securement device 12 is adjustable in setting direction 3 corresponding to the height or inclination adjustment. The setting unit 11 can herein be swivelled about a swivel axis 13, which, in the depicted embodiment example, is formed by a holding bracket 14 fastenable on the chassis of the motor vehicle, which supports the setting unit 11 such that it is swivellable about the swivel axis 13. The setting direction 3 can at each point of the circular arc, described by the longitudinal axis 4 of clamp bolt 19, be seen as a tangent on this circular arc; the setting direction 3 could also be approximately seen as a tangent on the point of a center position. Thus, if in the invention a toothing extending in the setting direction is discussed, the alignment on a circular path or a correspondingly approximately straight line is therewith included. The concept formation "substantially or essentially" with respect to the displacement direction must also be understood in this way.

The holding unit 5 includes side jaws 6, 15 on both sides of the setting unit 11. In the closed state of the securement device, the side jaws 6, 15 are set tightly on both sides against the setting unit 11, the setting unit 11 being held under frictional locking against a dislocation in the setting direction 3.

Figure 7:
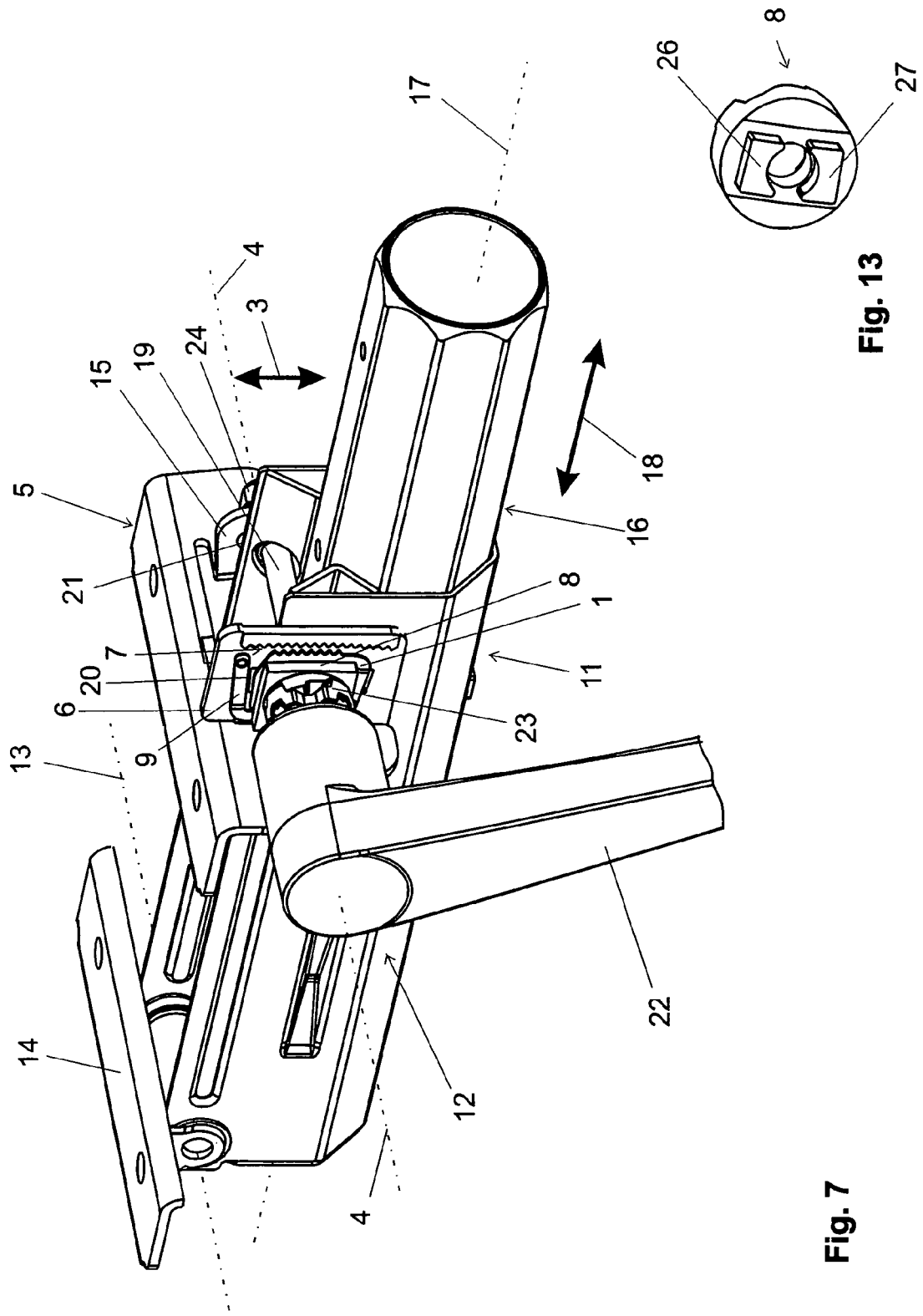
FIG. 7 is an oblique view of a steering column according to the invention, parts nonessential for the invention being omitted, in the opened state of the securement device.
Figure 8:
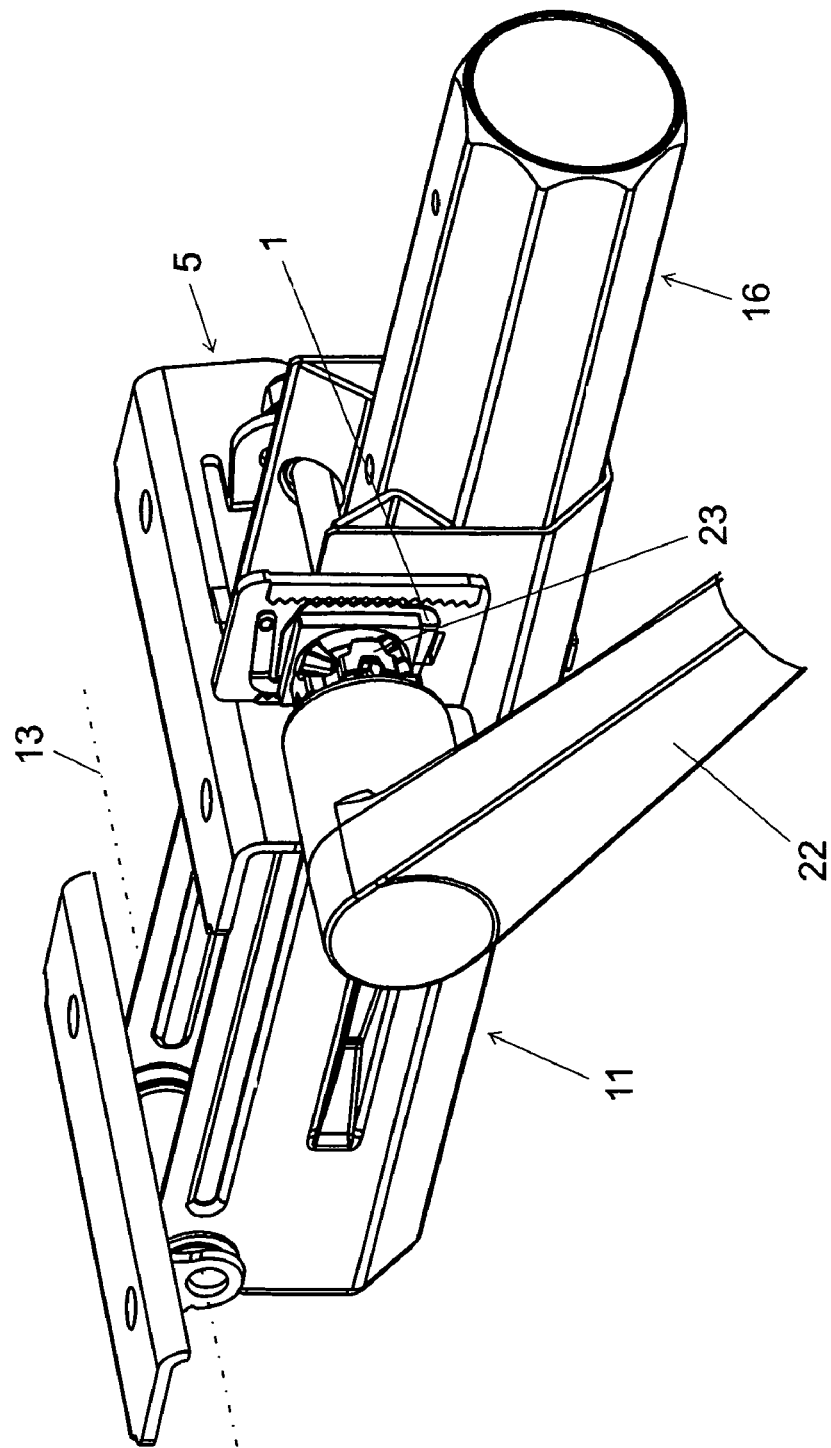
FIG. 8 is a depiction corresponding to FIG. 7, however in the closed state of the securement device.
Figure 9:
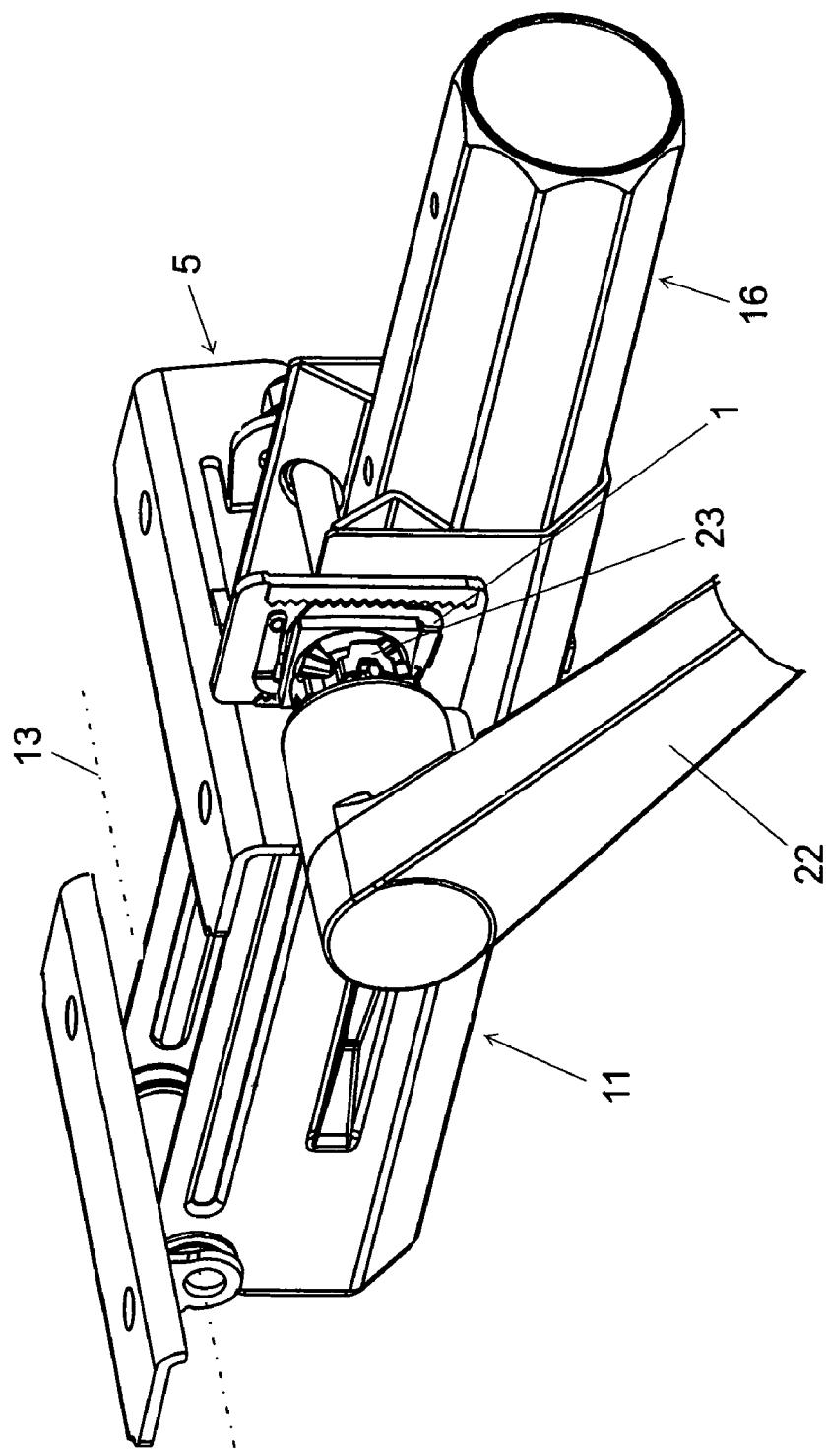
FIG. 9 is a depiction corresponding to FIG. 8, however the toothings of the tooth plate and the holding unit in mutual engagement.

In the embodiment according to FIGS. 7 to 9, furthermore, a jacket unit 16 at least partially encompassed by the setting unit 11 is provided, which rotatably bearing-supports a section, adjoining the steering wheel-side end of the steering column, of the steering spindle, of which in FIGS. 7 to 9 only the longitudinal axis 17 is shown. In the opened state of the securement device 12, the jacket unit 16 can be shifted with respect to the setting unit 11 in the setting direction 18 corresponding to the longitudinal displacement. In the closed state of the securement device 12, the setting unit 11 is set tightly against the jacket unit 16 whereby the longitudinal displacement of the jacket unit 16 is secured in place under frictional locking The jacket unit 16 comprises, on the surface facing away from the longitudinal axis 17 of the steering spindle, in the circumferential direction several planar areal sections, which act at least partially as friction faces. The setting unit 11, which at least partially encompasses the jacket unit 16, also comprises on its surface, directed toward the longitudinal axis 17, several planar areal sections, which act at least partially as friction faces. The planar areal section of the jacket unit 16 and of the setting unit 11 extend in the direction of the longitudinal axis 17 of the steering spindle. Three such planar areal sections, which are each at an angle to one another, can preferably in the closed state of the securement device 12 be brought into frictional locking contact in order to fix the set longitudinal position of the jacket unit 16. Through this implementation, the jacket unit 16 is further secured against twisting about the longitudinal axis 17 of the steering spindle with respect to the setting unit 11. Instead of a purely friction-locked securing of the jacket unit 16 with respect to the setting unit 11 in the closed state of the securement device 12, this fixing could also be frictional and positive locking.

Instead of the friction-locked retention system of the setting unit 11 with respect to the holding unit 5 in the locked state of the securement device 12, this retention could also be frictional and positive locking.

The securement device 12 comprises a clamp bolt 19 penetrating openings in the setting unit 11 and holding unit 5, which bolt is aligned transversely, especially at right angles, to the longitudinal axis 17 of the steering spindle. With a displacement of the setting unit 11 with respect to the holding unit 5 in the setting direction 3, the clamp bolt 19 moves with the setting unit 11 into the setting direction 3. The openings of setting unit 11 for the clamp bolt 19 have for this purpose, with respect to such bolt only minimal tolerance. The openings in the side jaws 6, 15 of the holding unit 5 are, in contrast, developed as elongated holes 20, 21 extending in the setting direction 3.

The securement device 12 comprises further an actuation lever 22 swivellable about the longitudinal axis 4 of the clamp bolt 19 between an open and a closed position. In its swivelling, the actuation lever 22 entrains a wedge disk 23 disposed rotatably on the clamp bolt 19, which disk cooperates with the press-on part 8 also penetrated by the clamp bolt 19, which press-on part in this embodiment example is implemented as a further wedge disk. When swivelling the actuation lever 22, oblique faces of the wedge disk 23 and of the press-on part 8 implemented as wedge disk cooperate whereby, on the one hand, the press-on part 8 is pressed in the direction toward the side jaw 6 and, on the other hand, the clamp bolt 19 is shifted with respect to the holding unit 5, wherein a holding counterpart 24, for example a nut screwed onto the clamp bolt 19, is pulled against the side jaw 15 lying on the opposite side of the setting unit 11. Through the clamping mechanism developed in this manner, the tooth plate 1 is pressed by the press-on part 8 onto the side jaw 6 and the side jaws 6 and 15 are pressed on both sides onto the setting unit 11, whereby the setting unit 11 is held with respect to the holding unit 5, in particular under frictional locking.

Further, by the tooth plate 1 in cooperation with the at least one toothing 7 of the side jaw 6 at a higher force acting into the setting direction 3, which would overcome the holding force exerted by the side jaws 6, 15 onto the setting unit 11, a displacement into the setting direction 3 is counteracted, at least after a minimal initial slipping of the tooth plate 1 with respect to the side jaw 6, until the teeth of the toothing (sets of teeth) 2, 7 come into engagement, as is illustrated in FIG. 9.

With a displacement of the setting unit 11 with respect to the holding unit 5 into the setting direction 3, the tooth plate 1 with the clamp bolt 19 is entrained in the setting direction 3. This entrainment takes place in the depicted embodiment via the press-on part 8 which includes extensions 26, 27 projecting into a window cutout 25, penetrated by clamp bolt 19, of the tooth plate 1. These extensions are evident in FIGS. 4 and 13. The extensions 26, 27 are herein of such length that they also project into the elongated hole 20 of side jaw 6, and especially also in the opened state of the securement device. Hereby, on the one hand, a security against twisting of the press-on part 8 is attained and, on the other hand, the alignment of the tooth plate 1 with respect to the side jaw 6 is effected.

The opened state of the securement device is depicted in FIG. 7. The steering column can here be adjusted in the setting direction 3, 18. The position of the tooth plate 1 with respect to the side jaw 6 corresponds to that depicted in FIGS. 1 and 4.

FIG. 8 shows the closed state of the securement device, the position of the tooth plate 1 with respect to side jaw 6 corresponding to the position depicted in FIGS. 2 and 5.

FIG. 9 shows the closed state of the securement device when the teeth of toothings 2, 7 are in engagement. The position of the tooth plate 1 with respect to the side jaw 6 corresponds to the position depicted in FIGS. 3 and 6, and this position, as already explained, can be assumed immediately after the closing of the securement device if, during the closing of the securement device, the teeth of toothings 2 are directly opposite the tooth interspaces of the teeth of toothings 7 and conversely, or, are reached starting from the position depicted in FIG. 8, in that onto the setting unit 11 a force acts in the setting direction 3 which exceeds the holding force exerted through the remaining securement elements acting between the setting unit 11 and the holding unit 5 in this setting direction 3.

The tooth plate could also be disposed on the side of the holding unit 5 opposite the actuation lever 22 and cooperate with at least one toothing of side jaw 15. The press-on part in the closed state of the securement device 12 pressing the tooth plate 1 onto the side jaw 15 could, for example, also be formed by a bolt head of clamp bolt 19.

Figure 10:
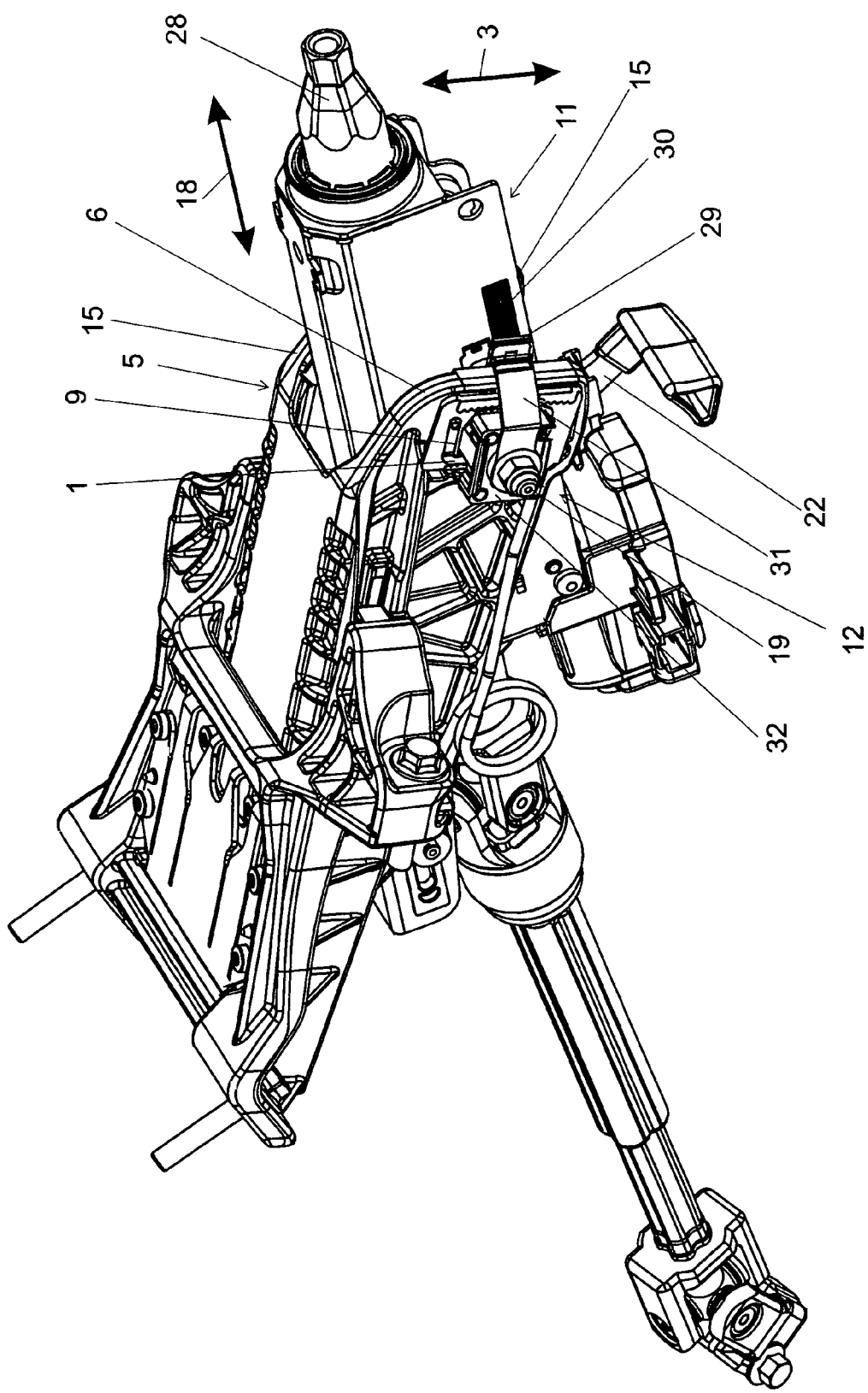
FIG. 10 is an oblique view of a further embodiment example of the invention.

FIG. 10 depicts a further embodiment of the invention. The setting unit 11 is here displaceable with respect to the holding unit 5 in the opened state of the securement device 12 in the setting direction 3 corresponding to the height or inclination adjustment as well as also in the setting direction 18 corresponding to the length adjustment. The clamp bolt 19 emplaced transversely, in particular at right angles, to the longitudinal axis of the steering spindle 28, penetrates for this purpose not only elongated holes in the side jaws 6, 15 aligned in the setting direction 3, but also elongated holes in the setting unit 11, which are aligned in the setting direction 18. The setting unit 11 here rotatably bearing-supports directly the steering spindle 28 (thus, forms a so-called steering column jacket, or a jacket unit).

In the closed state of the securement device 12, the setting unit 11 is clamped tightly between the side jaws 6, 15. The tooth plate 1 cooperates with the at least one toothing 7 of the side jaw 6 of holding unit 5 in the manner already described, wherein the clamp jaws 32 here form the press-on part pressing the tooth plate 1 in the closed state of the securement device against the holding unit 5.

In addition, in this embodiment, a clamping wedge 29 is provided through which, in the event of a crash, an additional holding force is effected against a displacement of the setting unit 11 in the setting direction 18. In the closed state of the securement device, the clamping wedge 29 is placed on a contact face 30 of the setting unit 11 and is engaged with it in positive locking and/or frictionally locking contact. In the event of a crash, the clamping wedge 29 is thereby entrained by the setting unit 11 along the displacement direction 18 of setting unit 11 with respect to the holding unit 5 and can become wedged in a gap between setting unit 11 and holding unit 5, in particular of the side jaw 6 of the holding unit 5. With the opening of the securement device, the clamping wedge 29 is raised from the contact face 30 of the setting unit 11. For this purpose, it is preferably disposed on a support arm 31, via which it is connected with a part, in particular the clamp bolt 19 or a clamp jaw 32 disposed on the clamp bolt 19, of the securement device moving during the opening and closing of the securement device 12. A clamping wedge acting in this manner is disclosed in DE 10 2004 051 060 B3 cited in the introduction to the specification. For the entrainment of the tooth plate 1 with the clamp bolt 19 during its movement in the setting direction 3 and for the alignment of the tooth plate 1 with respect to side jaw 6, here the clamp jaw 32 can comprise an extension projecting into the window cutout 25 of tooth plate 1 and the elongated hole 20 of the side jaw 6.

Figure 11:
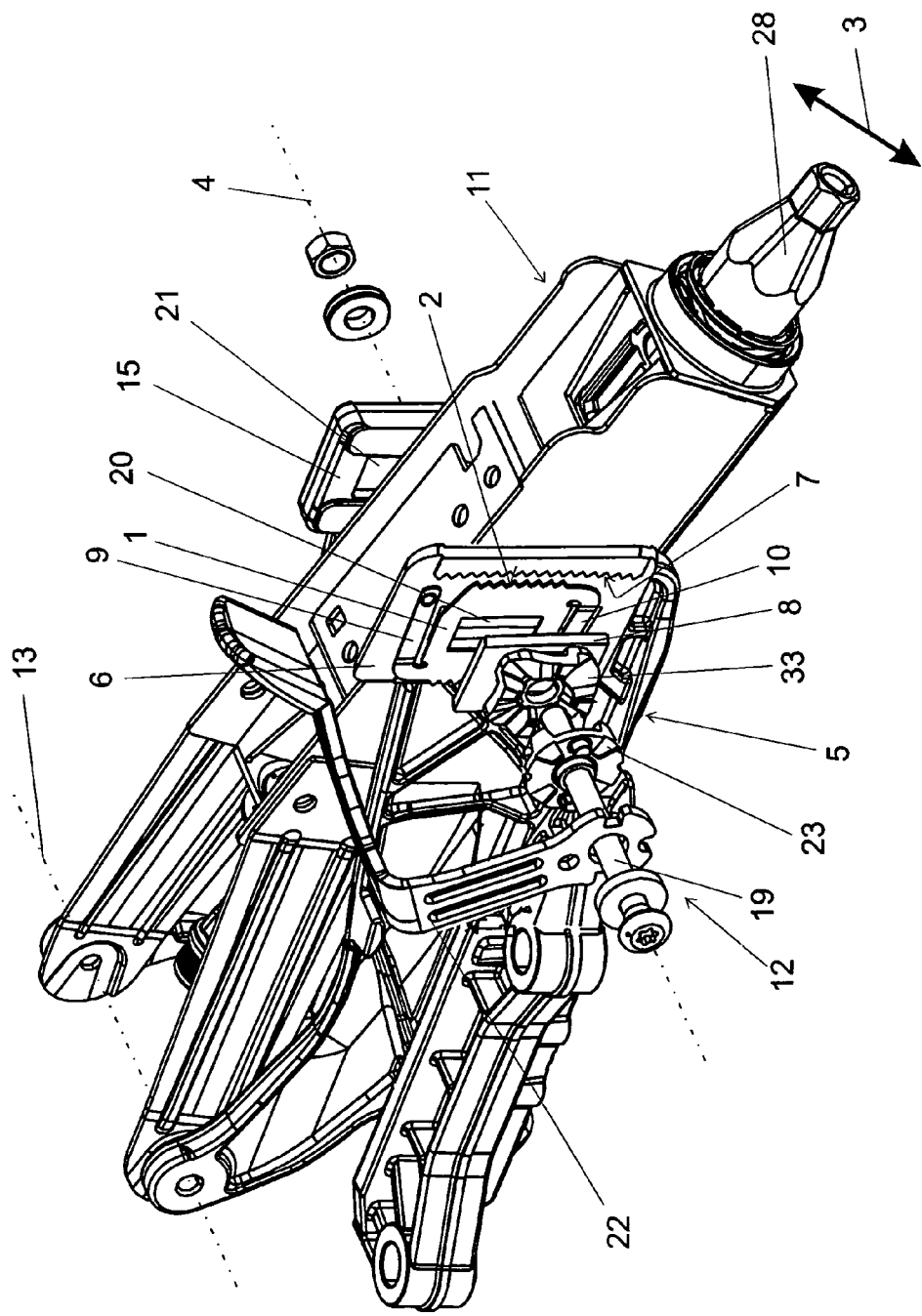
FIG. 11 is an oblique view of a third embodiment example of the invention, parts of the securement device depicted in exploded view.

A further embodiment of the invention is depicted in FIG. 11. The steering column is here only displaceable in the setting direction 3 corresponding to the height or inclination adjustment. The setting unit 11 is herein swivellable about the swivel axis 13 with respect to the holding unit 5. Analogous to the previously described embodiments, the setting unit 11 is clamped, in the closed state of the securement device 12, between side jaws 6, 15 of holding unit 5. The clamp bolt 19 of securement device 12 penetrates here again the elongated holes 20, 21 in the side jaws 6, 15 extending in the setting direction 3.

The securement device 12 is implemented analogously to the securement device described in connection with FIGS. 7 to 9. The press-on part 8 pressing the tooth plate 1 in the closed state of the securement device 12 onto the side jaw 6 is here formed by a plate penetrated by clamp bolt 19, which plate can be formed integrally with the wedge disk 33 or be disposed between it and the tooth plate 1 on the clamp bolt 19. On the press-on part 8 again an extension is provided projecting into the window cutout 25 of tooth plate 1 and the elongated hole 20 of the side jaw 6 and is not visible in FIG. 11.

Figure 12:
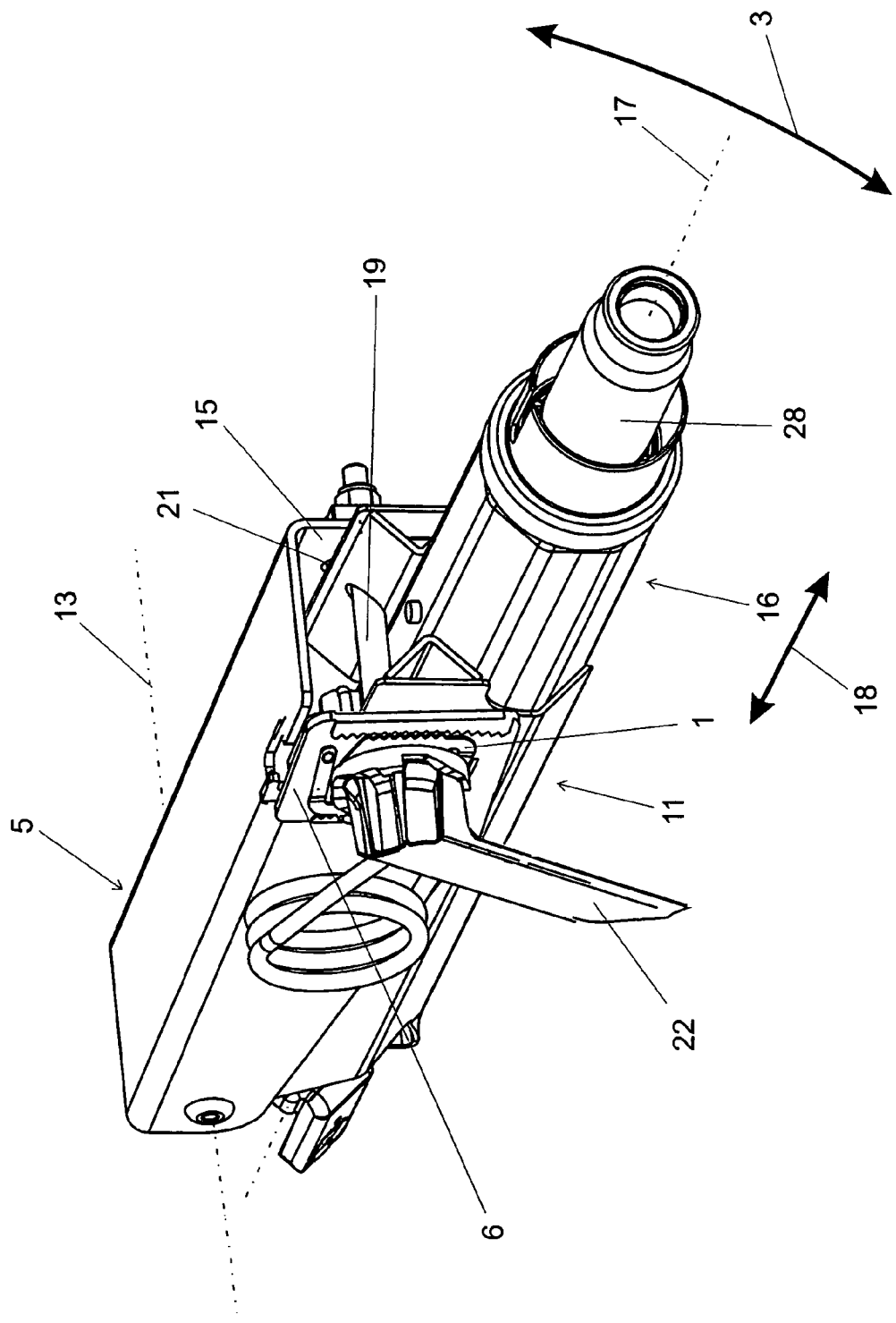
FIG. 12 is an oblique view of a fourth embodiment example of the invention.

A further embodiment of the invention is depicted in FIG. 12. Apart from the implementation of the holding unit 5, it is similar to the embodiment example explained already in connection with FIGS. 7 to 9. The holding unit 5 forms here also the swivel axis 13 for the swivelling of the setting unit 11 for the height or inclination adjustment of the steering column. The holding unit 5 can, again, be fastened on the motor vehicle chassis, for example via welded-on fastening lugs, which are not shown in FIG. 12.

Various modifications of the depicted embodiment are conceivable and feasible without leaving the scope of the invention. Tooth plate 1 could counteract, in the closed state of the securement device 12, also a displacement of the setting unit 11 in the setting direction 18 corresponding to the length adjustment of the steering column. For this purpose the elongated holes 21, 22 penetrated by the clamp bolt and tooth rows of the toothings 2, 7 would have to be aligned in this setting direction 18.

Also conceivable and feasible are dispositions of tooth plates 1 on both outer sides of side jaws 6 and corresponding toothings 7 of both side jaws 6 cooperating with the toothings of the tooth plates.

Instead of the spring-elastic arms 9, 10 of tooth plate 1 or in addition to these spring-elastic elements could also be provided separate spring-elastic elements acting between the tooth plate 1 and the holding unit, for example coil springs disposed in pocket holes of side jaws 6. One or several separate spring-elastic elements could also be provided directly acting between the holding unit 5 and the press-on part 8.

In the depicted embodiment, the toothings 2, 7 extend in the form of arcs about the swivel axis 13. Instead, toothings 2, 7 extending in a straight line would also be conceivable and feasible. The tooth plate 1 could here be supported with a tolerance in the direction at right angles to the setting direction 3 with respect to the press-on part 8, and for the alignment for the tooth plate 1 with respect to the side jaw 6 in this direction an appropriate guidance could be provided, for example through recessed guide tracks for the contact ends of the arms 9, 10 on the side jaw.

The entrainment of the tooth plate 1 by the clamp bolt 19 with a shift of the clamp bolt 19 in the displacement direction 3, in which the tooth plate 1 acts, could, for example, also be effected thereby that the tooth plate 1 is penetrated by the clamp bolt 19 through a round hole with low tolerance.

It would, in principle, also be conceivable and feasible to implement the at least one toothing 2 of tooth plate 1 on a step of the tooth plate 1, wherein implementation on the side edge is preferred.

A steering column in which the holding unit comprises only one side jaw, resting on one of the sides of the setting unit, could also be implemented in the manner according to the invention.

Also conceivable and feasible is providing positive-locking securement elements at least for the setting direction in which the tooth plate does not act. Such securement elements could advantageously be provided herein which, during the closing of the securement device, in any case cooperate immediately with positive locking.

The form of the toothing can be highly diverse according to the invention. Acuate toothings as well as also round toothings or other toothings can be employed advantageously.

Also conceivable and feasible is the combination and/or substitution of individual characteristics, such as are illustrated in distinct embodiments of the invention in conjunction with the various examples.

As is evident based on the above description, the scope of the invention is not limited to the depicted embodiments, but should be determined with reference to the attached claims together with their full range of feasible equivalents.

While the above description and the drawing depict the invention, it is obvious for a person of skill in the art that diverse changes can be carried out therein without leaving the true spirit and scope of the invention.

LEGEND TO THE REFERENCE NUMBERS

1 Tooth plate
2 Toothing
3 Setting direction
4 Longitudinal axis
5 Holding unit
6 Side jaw
7 Toothing
8 Press-on part
9 Arm
10 Arm
11 Setting unit
12 Securement device
13 Swivel axis
14 Holding bracket
15 Side jaw
16 Jacket unit
17 Longitudinal axis
18 Setting direction
19 Clamp bolt
20 Elongated hole
21 Elongated hole
22 Actuation lever
23 Wedge disk
24 Holding counterpart
25 Window cutout
26 Extension 27 Extension
28 Steering spindle
29 Clamping part [sic: Clamping wedge]
30 Contact face
31 Support arm
32 Clamp jaw
33 Wedge disk
34 Comb
35 Comb

The invention claimed is:

1. An adjustable steering column for a motor vehicle, comprising
a setting unit displaceable in at least one setting direction;
a holding unit nondisplaceable in the at least one setting direction, said holding unit having a set of teeth; and
a securement device to be configured in a closed state and an open state such that, in the open state, said setting unit is displaceable with respect to said holding unit for allowing a position of the steering column to be set and such that, in the closed state, said setting unit is secured with respect to said holding unit by said securement device, said securement device including:
a clamp bolt penetrating openings in said setting unit and said holding unit;
an elastically flexible tooth plate penetrated by said clamp bolt, said tooth plate having a set of teeth for engaging with said set of teeth of said holding unit when said securement device is in the closed state, said set of teeth of said tooth plate facing away from said clamp bolt, said set of teeth of said holding unit facing towards said clamp bolt; and
a press-on part penetrated by a longitudinal axis of said clamp bolt, said tooth plate being located between said holding unit and said press-on part, said press-on part being configured to press said tooth plate onto said holding unit in the closed state of said securement device;
wherein said holding unit and said securement device are configured such that, in the open state of said securement device, said set of teeth of said tooth plate are spaced apart from said set of teeth of said holding unit along a direction of the longitudinal axis of said clamp bolt by a spring force; and
wherein said set of teeth of said tooth plate comprises a first set of teeth, said tooth plate further comprising a second set of teeth facing in an opposite direction than said first set of teeth of said tooth plate, and said set of teeth of said holding unit comprises a first set of teeth, said holding unit further comprising a second set of teeth facing said first set of teeth of said holding unit for engaging with said first set of teeth and said second set of teeth of said tooth plate.

2. The adjustable steering column of claim 1, wherein said tooth plate is disposed on an outer side of a side jaw of said holding unit, said outer side facing away from and located next to said setting unit, said side jaw having an elongated hole through which said clamp bolt penetrates said side jaw, and said first set of teeth of said holding unit being disposed on said side jaw.

3. The adjustable steering column of claim 1, wherein said holding unit comprises side jaws, each of said side jaws being located on a respective one of both sides of said setting unit, said side jaws including elongated holes penetrated by said clamp bolt and being configured such that, in the closed state of said securement device, said side jaws are pressed by said securement device onto said setting unit.

4. The adjustable steering column of claim 1, wherein, in the closed state of said securement device, said setting unit is held under frictional locking with respect to said holding unit through cooperating friction faces of said setting unit and said holding unit in the at least one setting direction in which said tooth plate is effective.

5. The adjustable steering column of claim 1, wherein said first set of teeth of said tooth plate are located outside of a press-on region, said press-on part being in contact on said tooth plate over the press-on region in the closed state of said securement device.

6. The adjustable steering column of claim 1, wherein said securement device and said holding unit are configured such that said tooth plate and said clamp bolt are shifted with respect to said holding unit in the at least one setting direction in which said tooth plate is effective by a displacement of said setting unit with respect to said holding unit in the at least one setting direction in which said tooth plate is effective.

7. The adjustable steering column of claim 6, wherein for entrainment of said tooth plate during a displacement of said setting unit with respect to said holding unit in the at least one setting direction in which said tooth plate is effective, said press-on part entrained by said clamp bolt has at least one extension engaging into a window cutout of said tooth plate.

8. The adjustable steering column of claim 7, wherein said at least one extension of said press-on part also engages into an elongated hole of a side jaw of said holding unit for securing said press-on part against twisting.

9. The adjustable steering column of claim 1, wherein said first set of teeth of said tooth plate are disposed in a row extending at least substantially in the at least one setting direction in which said tooth plate in the closed state of said securement device counteracts a displacement of said setting unit with respect to said holding unit.

10. The adjustable steering column of claim 1, wherein said first set of teeth of said tooth plate are disposed on an extending side edge of said tooth plate.

11. The adjustable steering column of claim 10, wherein said first set of teeth and said second set of teeth of said tooth plate are disposed on opposite side edges of said tooth plate.

12. The adjustable steering column of claim 1, wherein said tooth plate is configured to act against a height or inclination adjustment of the steering column in the closed state of said securement device.

13. The adjustable steering column of claim 1, wherein said tooth plate comprises spring-elastic arms abutting against said holding unit, said spring-elastic arms being configured to space said first set of teeth of said tooth plate from said first set of teeth of said holding unit during opening of said securement device.

14. The adjustable steering column of claim 13, wherein said tooth plate is configured to shift said press-on part in a direction away from said holding unit during the opening of said securement device.

15. The adjustable steering column of claim 1, wherein said clamp bolt is oriented such that the longitudinal axis of said clamp bolt is at a right angle to a longitudinal axis of the steering spindle.

16. The adjustable steering column of claim 1, wherein said press-on part comprises an extension engaging into a window cutout of said tooth plate and into an elongated hole of said holding unit for alignment of said tooth plate with respect to said first set of teeth of said holding unit.

17. The adjustable steering column of claim 1, wherein said first set of teeth of said tooth plate and said first set of teeth of said holding unit point in a direction at a right angle to the longitudinal axis of said clamp bolt and at a right angle to the at least one setting direction in which said tooth plate is effective.

18. The adjustable steering column of claim 1, wherein each of said first set of teeth of said tooth plate and said first set of teeth of said holding unit has a comb extending parallel to the longitudinal axis of said clamp bolt.

* * * * *